US006434656B1

(12) United States Patent
Downer et al.

(10) Patent No.: US 6,434,656 B1
(45) Date of Patent: Aug. 13, 2002

(54) METHOD FOR ROUTING I/O DATA IN A MULTIPROCESSOR SYSTEM HAVING A NON-UNIFORM MEMORY ACCESS ARCHITECTURE

(75) Inventors: Wayne Alan Downer; D. Scott Guthridge; Gerrit Huizenga, III, all of Portland, OR (US); Chandrasekhar Pulamarasetti, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/307,132

(22) Filed: May 7, 1999

Related U.S. Application Data

(60) Provisional application No. 60/084,775, filed on May 8, 1998.

(51) Int. Cl.⁷ .............................................. G06F 13/00
(52) U.S. Cl. ...................... 710/316; 710/100; 710/104; 710/305; 709/238
(58) Field of Search ........................ 709/200, 217–219, 709/220, 221, 238, 239; 710/131, 100, 104, 305, 316; 713/1, 100; 370/256, 255, 254

(56) References Cited

U.S. PATENT DOCUMENTS

| | | | | |
|---|---|---|---|---|
| 5,251,290 A | * | 10/1993 | Pabon | 395/120 |
| 5,630,173 A | * | 5/1997 | Oprescu | 710/40 |
| 5,682,479 A | * | 10/1997 | Newhall et al. | 709/242 |
| 5,712,791 A | * | 1/1998 | Lauterbach | 364/489 |
| 5,732,192 A | * | 3/1998 | Malin et al. | 395/500.23 |
| 5,784,648 A | * | 7/1998 | Duckwall | 710/40 |
| 5,802,289 A | * | 9/1998 | Oprescu | 709/248 |
| 5,862,386 A | * | 1/1999 | Joseph et al. | 395/712 |
| 5,870,566 A | * | 2/1999 | Joh | 709/251 |

OTHER PUBLICATIONS

Patterson et al., *Computer Architecture A Quantitative Approach*, 2nd Ed. 1996, pp. 571–594.
McKusick et al., *The Design and Implementation of the 4.4BSD Operating System*, Aug. 1996, pp. 45, 496–502.
Tving, Ivan, *Multiprocessor Interconnection Using SCI, a Master Thesis*, Aug. 28, 1994, pp. 18–57.
Johnson et al., *Interconnect Topologies with Point–to–Point Rings*, Dec. 1991, pp. 1–11, Computer Sciences Technical Report #1058, University of Wisconsin.

* cited by examiner

*Primary Examiner*—Xuan M. Thai
(74) *Attorney, Agent, or Firm*—Klarquist Sparkman, LLP

(57) ABSTRACT

In a multiprocessor system, a method for dynamically establishing an I/O path between a processor node and an I/O device for routing data there between. The method starts with providing a configuration graph. The graph has objects associated with elements (devices) of the system and links connecting the objects. The node is identified, and links are then followed in the graph from an object associated with the I/O device to an object associated with a node. If multiple I/O paths exist and an optimal path is desired, the method includes providing in the links routing information containing nodes that can be directly reached via the link. Links are then followed, if possible, whose routing information contains the identified node. If no link having such routing information exists at an object along the path, then another link is chosen having routing information containing another node. This other link may be chosen in a round robin manner if there are multiple links to choose from. If multiple links having such routing information exist at an object along the path, then one of the links is chosen in a round robin manner. The method may also be used in uniprocessor systems such as a system with a one-processor node for simply establishing multiple paths to provide fault tolerance.

20 Claims, 7 Drawing Sheets

1. for each object scheduled for probing
2. for each interface type the object provides
3. for each device type on the interface
4. for each parent port in that interface type
5. for each hardware address (unit)
   probe
   if found
   create object (if new) and link thereto
   schedule object for probing

LINK DATA STRUCTURE

OBJECT DATA STRUCTURE

METHOD FOR ROUTING I/O DATA IN A MULTIPROCESSOR SYSTEM HAVING A NON-UNIFORM MEMORY ACCESS ARCHITECTURE

RELATED APPLICATION DATA

This application is based on U.S. Provisional Patent Application Ser. No. 60/084,775, filed May 8, 1998.

FIELD OF THE INVENTION

This invention relates generally to multiprocessor computer systems that are comprised of a number of separate but interconnected processor nodes. More particularly, this invention relates to a method for efficiently routing I/O data between a processor and an I/O device within the system where multiple paths between the processor and I/O device exist.

BACKGROUND OF THE INVENTION

Multiprocessor computers by definition contain multiple processors that can execute multiple parts of a computer program or multiple distinct programs simultaneously, in a manner known as parallel computing. In general, multiprocessor computers execute multithreaded-programs or single-threaded programs faster than conventional single processor computers, such as personal computers (PCs), that must execute programs sequentially. The actual performance advantage is a function of a number of factors, including the degree to which parts of a multithreaded-program and/or multiple distinct programs can be executed in parallel and the architecture of the particular multiprocessor computer at hand.

Multiprocessor computers may be classified by how they share information among the processors. Shared memory multiprocessor computers offer a common physical memory address space that all processors can access. Multiple processes or multiple threads within the same process can communicate through shared variables in memory that allow them to read or write to the same memory location in the computer. Message passing multiprocessor computers, in contrast, have processor nodes with a separate memory space for each processor, requiring processes in such a system to communicate through explicit messages to each other.

Shared memory multiprocessor computers may further be classified by how the memory is physically organized. In distributed shared memory (DSM) machines, the memory is divided into modules physically placed near each processor. Although all of the memory modules are globally accessible, a processor can access memory placed nearby faster than memory placed remotely. Because the memory access time differs based on memory location, distributed shared memory systems are also called non-uniform memory access (NUMA) machines. In centralized shared memory computers, on the other hand, the memory is physically in one location. Centralized shared memory computers are called uniform memory access (UMA) machines because the memory is equidistant in time from each of the processors. Both forms of memory organization typically use high-speed cache memory in conjunction with main memory to reduce execution time.

Multiprocessor systems with distributed shared memory are organized into processor nodes with one or more processors per node. Also included in the node are local memory for the processors, a remote cache for caching data obtained from other nodes, logic for linking the node with other nodes in the system, possibly logic for communicating with an I/O subsystem, and a node bus connecting these elements together. The processor nodes are linked with a system interconnect that provides high bandwidth and low latency. An example of such an interconnect is a switch-based network that uses the Scalable Coherent Interface (SCI) protocol. Other interconnection schemes are, of course, possible. Further information on multiprocessor computer systems in general and NUMA machines in particular can be found in a number of works including Computer Architecture: A Quantitative Approach (2nd Ed. 1996), by D. Patterson and J. Hennessy.

The conventional I/O subsystem of a multiprocessor system typically includes multiple I/O devices such as disk drives and tapes that are connected to one or more of the processor nodes. Dual I/O paths between nodes and the I/O devices are sometimes built into the I/O subsystem to make the system fault tolerant by ensuring that I/O requests are successfully handled in the event a primary signal path is blocked. This blocking might occur, for example, if a switch or other device within the subsystem fails or if a node or other device is taken off-line for replacement or maintenance. In such an event, a secondary path is used until the primary path is again available.

The problem with providing multiple paths in this manner is that it is system specific, requiring paths to be set for each contemplated system configuration. If a user wished to change a system configuration by adding an additional I/O device, for example, the operating system would have to be modified to recognize new primary and secondary paths to the new I/O device. Such modifications make it costly to configure multiprocessor systems to meet a user's unique requirements.

An objective of the invention, therefore, is to provide a method for dynamically establishing an I/O path between a processor node and an I/O device in a computer system. Another objective of the invention is to establish an optimal I/O path between a processor node and an I/O device within the system, where multiple paths exist.

SUMMARY OF THE INVENTION

The invention includes a method for dynamically establishing an I/O path between a processor node and an I/O device in a multiprocessor system. The method starts with providing a configuration graph. The graph has objects associated with elements (devices) of the system and links connecting the objects. The node is identified, and links are then followed in the graph from an object associated with the I/O device to an object associated with a node. If multiple I/O paths exist and an optimal path is desired, the method includes providing in the links routing information containing nodes that can be directly reached via the link. Links are then followed, if possible, whose routing information contains the identified node. If no link having such routing information exists at an object along the path, then another link is chosen having routing information containing another node. This other link may be chosen in a round robin manner if there are multiple links to choose from. If multiple links having such routing information exist at an object along the path, then one of the links is chosen in a round robin manner.

Other aspects of the invention include constructing the configuration graph and adding routing information to the configuration graph.

The ability to establish an optimal path each time an I/O request is made provides fault tolerance to the computer system. If a subsystem device along one path between an I/O device and an intended node fails, the system can be quickly reconfigured and another path established that does not require the failed device.

Although the invention may have most value in multi-processor systems with a NUMA architecture, it is not restricted to such. The method may also be used in uniprocessor systems such as a system with a one-processor node for simply establishing multiple paths to provide fault tolerance.

These and other aspects of the invention are more fully described below with reference to an illustrative embodiment.

DETAILED DESCRIPTION OF AN ILLUSTRATIVE EMBODIMENT

The invention has been implemented within the operating system of a multiprocessor computer system such as the one shown and described herein. It should be readily recognized from this disclosure, however, that the invention is not limited to this illustrative embodiment but that aspects of it can be applied in any suitable software or any multiprocessor or uniprocessor system.

The Multiprocessor System and Its Multiple I/O Paths

Figure 1:
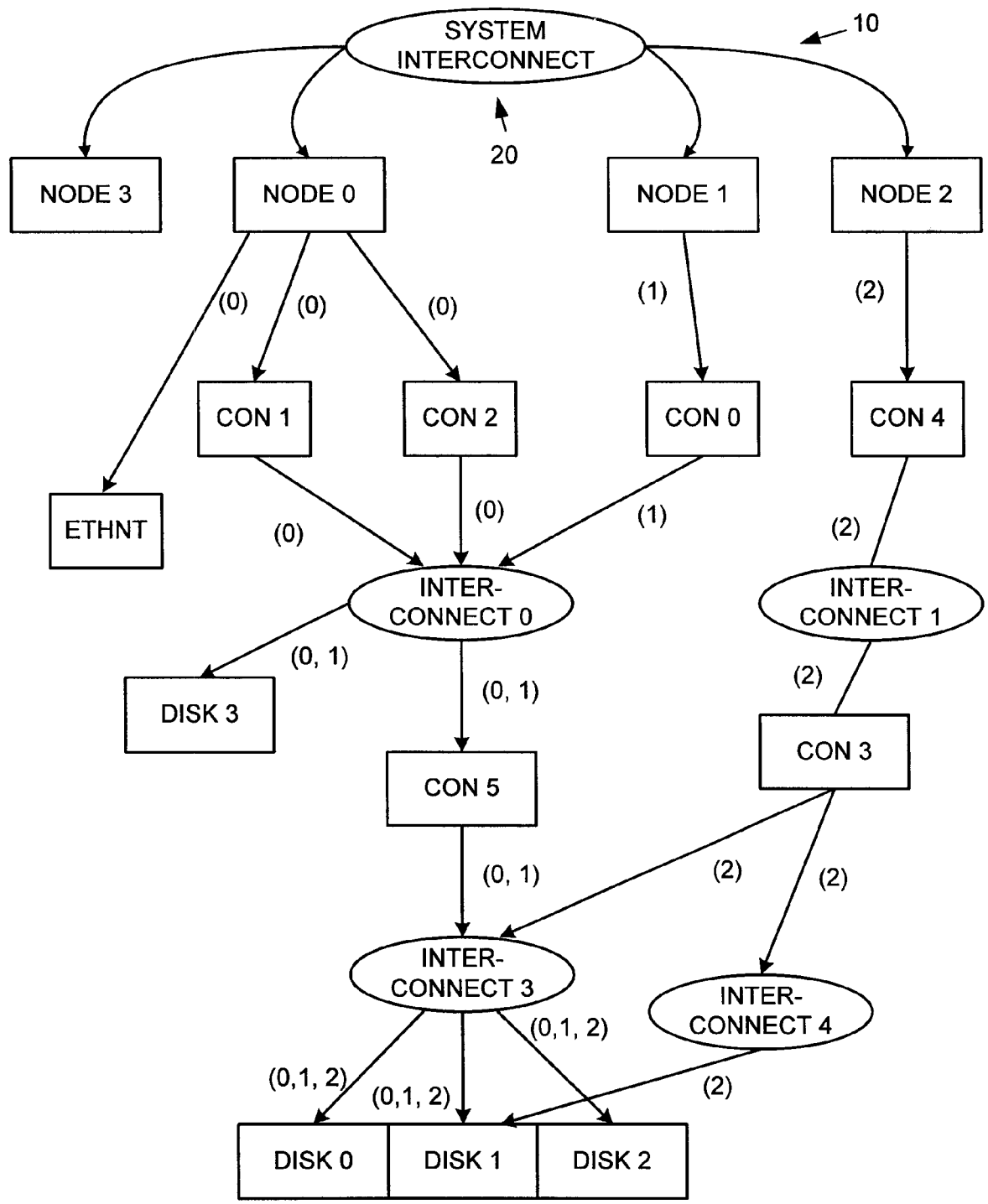
FIG. 1 is a block diagram of a multiprocessor system having multiple paths for routing data between processor nodes and I/O devices. The figure is also a configuration graph of the multiprocessor system.

FIG. 1 is a block diagram of a multiprocessor computer system 10 that uses a computer architecture based on distributed shared memory (DSM). This type of computer system is also known as a NUMA machine. In the system 10 four processor nodes 0, 1, 2, and 3 are shown connected by a system interconnect 20 that permits any node to communicate with any other node. The purpose of system interconnect 20 is to allow processors in any node to directly and transparently access the physical memory that resides in any other node. System interconnect 20 in the illustrative embodiment is a switch-based network that uses the Scalable Coherent Interface (SCI) interconnection mechanism. SCI is an IEEE-approved standard that is well documented in a number of publications including IEEE Std 1596–1992 (Aug. 2, 1993) and Multiprocessor Interconnection Using SCI, a Master Thesis by Ivan Tving, DTH ID-E 579 (1994), both of which are incorporated by reference. Other interconnects can, of course, be used.

The physical links of interconnect 20 provide high bandwidth and low latency and are scalable to allow for the addition of more nodes. Links that meet these requirements presently include point-to-point interconnects with a data throughput of one gigabyte/second or greater. The links can be configured in any number of suitable ways for connecting the processor nodes, such as in a ring topology, in arbitrary topologies through switches, or in a combination of both. The links can be wired or wireless (optical, RF, etc.) depending upon system performance needs. Additional topologies are described in "Interconnect Topologies with Point-To-Point Rings," Ross E. Johnson and James E. Goodman, December 1991, Computer Sciences Technical Report #1058, University of Wisconsin—Madison.

The elements of system 10 include the nodes and devices of its I/O subsystem that define multiple paths between I/O devices and processor nodes. These subsystem devices permit processors in the nodes to save data to and retrieve data from I/O devices. The subsystem devices include controllers (also known as adapters), interconnects (which may be an arbitrated loop, a switch fabric, a bus, etc.), and the I/O devices themselves, such as disk drives and tapes. A network controller Ethnt connects the system 10 to a local area network (LAN). Controllers such as con 0–5 convert data from one format to another for transmission through the I/O subsystem. Con 0, 1, 2, and 4, for example, may translate incoming data packets from the nodes into Fibre Channel packets. These packets are then forwarded through interconnects 0 and 1, which in this embodiment are Fibre Channel switches, to con 3 and 5. These controllers convert the Fibre Channel packets into a format suitable for I/O devices, such as a SCSI (Small Computer Serial Interface) format. The SCSI data packets are then sent through interconnects 3 and 4 to their intended destinations, such as multi-ported disk 1. These controllers, of course, work both ways, converting data being sent from I/O devices to processor nodes as well as data being sent from processor nodes to I/O devices.

Whether a controller or interconnect is needed in a multiprocessor system is a function of the system's composition. Some I/O devices, such as represented by disk 3, can handle data in Fibre Channel format and do not need an intermediate controller to convert the data to a different format. Other I/O devices may require other types of controllers. Other types of interconnects may be used. What should be appreciated from the illustrative embodiment is that multiple signal paths within the I/O subsystem of the multiprocessor system are provided for communicating data between a node and an I/O device; the particular nature of each path is not important to the invention.

Establishing an Optimal I/O Path

Figure 2:
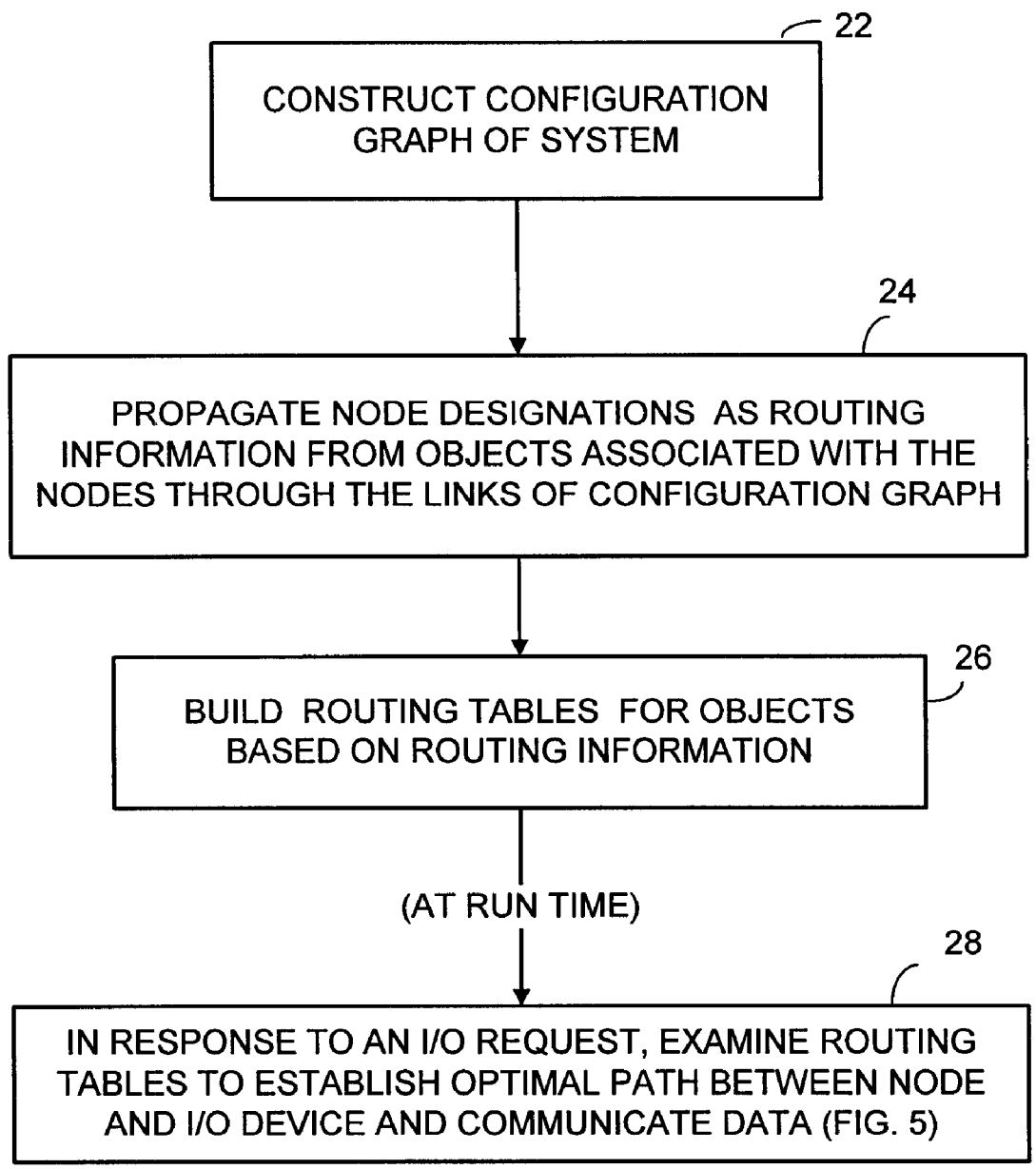
FIG. 2 is a flowchart of an overall method for establishing an optimal path among the multiple I/O paths within a multiprocessing system, beginning with constructing a configuration graph.

FIG. 2 is a flowchart of an overall method for establishing an optimal path among the multiple I/O paths within a multiprocessing system such as system 10. An optimal path is a direct path from an I/O device to an intended node without traversing the system interconnect 20, whenever such as path exists. Such an optimal path provides higher I/O performance because the system interconnect adds latency to a path. If a direct path between an I/O device and an intended node does not exist at the time of the I/O request, then the optimal path is a direct path between the I/O device and another node, with a final leg from the other node across the system interconnect to the intended node. The method begins with constructing a configuration graph of the system (22). This action occurs at system initialization, when the system is booted. It also occurs during on-line removal (OLR) or insertion (OLI) of an I/O subsystem device, which means that the device is removed from or inserted into the system while it is running (on line). OLR and OLI allow a system to be maintained or changed without shutting it down. With the graph in place, node designations such as node numbers are propagated as routing information from objects associated with the nodes through the links of the configuration graph to objects associated with I/O devices (24). Routing tables are then built for objects based on the routing information (26).

At some point during operation of the multiprocessor system, an I/O request is made by a processor to an I/O device. This request may take the form of writing to or reading from a particular disk, with the data being transmitted from or to memory on a particular processor node. In carrying out the I/O request, the routing tables are examined to establish an optimal path between an identified node and the I/O device. The data is then communicated between the two system elements along the path (28). An optimal path is dynamically established for each I/O request at the time of the request, and thus there is no one optimal path for all requests.

How each of the parts of the method is implemented in the illustrative embodiment is discussed in detail below.

Constructing a Configuration Graph as Part of Configuring a System

FIG. 1 may also be viewed as a configuration graph of the multiprocessor system. Autoconfiguration is a process of the operating system that constructs the configuration graph in software as the process recognizes and enables the hardware devices in the system. Static autoconfiguration processes are well known in the art. They look for a certain hardware device at a specific system location and report whether such a hardware device is present at that location. See, for example, the description of a typical autoconfiguration procedure in the UNIX operating system given by McKusick et al. in The Design and Implementation of the 4.4 BSD Operating System (Addison-Wesley 1996). The autoconfiguration procedure in the illustrative embodiment differs from these conventional processes in that it is dynamic in nature rather than static. It recognizes hardware devices regardless of their location in the system.

In the illustrative embodiment, autoconfiguration is a process of the operating system's kernel that, with the kernel's device drivers, locates and prepares subsystem devices (I/O devices, controllers, interconnects, etc) for use. These devices can be interconnected in numerous ways such that there may be several "hops" through different types of controllers between a processor node and a given I/O device and multiple paths between the node and the I/O device. The autoconfiguration procedure navigates this tangle of devices, finds which devices are present, and determines how they are interconnected. The resulting "map" of these device interconnections takes the form of a directed graph where vertices represent devices and edges represent the links between them. A particular vertex in this graph, known as the "root", represents the system interconnect 20. All vertices in the graph are reachable by tracing paths through the edges from this root vertex. Communication between autoconfiguration and the device drivers gives the device drivers enough information to construct private data structures. The communication also gives autoconfiguration enough information to deduce the hardware configuration and thus to construct the configuration graph.

The term "object" is used herein to represent a vertex in the graph, and the term "link" to represent an edge. Each object and link represents a corresponding element of the hardware configuration. Each link is a directed link having a tail and head. The object at the tail of a link is called a parent object and the object at the head of a link is called a child object. Thus, as shown in FIG. 1, there is a corresponding relationship between a particular system configuration and the configuration graph that represents it. While devices are often represented by single objects, this is not required. A device that has several major functions (such as supplying a number of serial ports, a SCSI bus and an Ethernet controller) can be represented by a multiple objects each representing a different function.

Figures 3A, 3B:
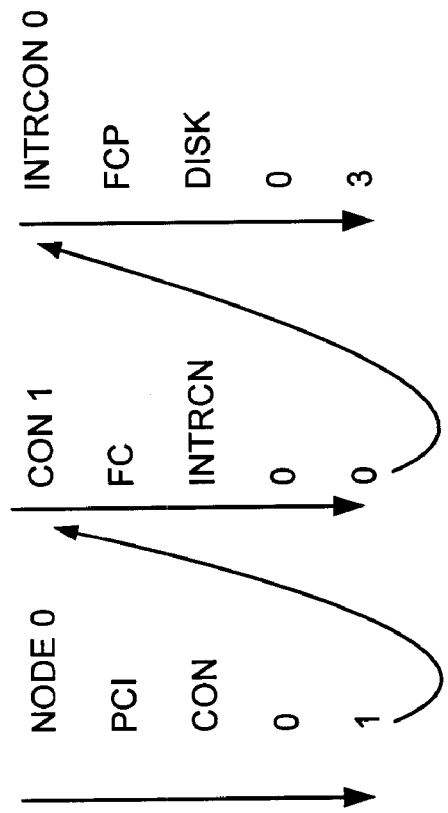
FIGS. 3A and B are, respectively, a block of pseudo-code describing how a configuration graph is constructed as part of configuring a computer system and a example thereof.

FIG. 3A contains a block of pseudo-code describing generally how the autoconfiguration procedure of the illustrative embodiment constructs a configuration graph of a multiprocessor system such as the graph of FIG. 1. Other ways may, of course, be possible. Initially a root object is created for system interconnect 20 and scheduled for probing. This object is then probed, which means that each of the actions described in the pseudo-code are performed on the object. In the case of the system interconnect object, the probing finds nodes 0–3, creates objects for them and links thereto, and schedules each node for probing. Each scheduled node is then probed in turn. For example, the object for node 0 is probed for connections to subsystem devices. To find the possible connections, each interface type the object provides is examined (pseudo-code line 1). In the case of node 0, these interface types may be PCI (Peripheral Component Interconnect local bus), EISA (Extended Industry Standard Architecture), or some other interface. For each interface type, each device type (also known as an object type or config type) that might be found on the interface is examined (pseudo-code line 2). For the PCI interface, possible device types in the illustrative embodiment include PCI-to-Fibre Channel bridge controllers such as con 1 or Ethernet controllers such as Ethnt. For each device type, each unit (hardware addresses) of each port of the interface type is then probed. In effect, the five lines of pseudo-code describe five nested loops that are used to examine each hardware address of each port of an object for connections to other devices. If a device is found and that device does not already have an object, a new object is created for the found device. A link between the probed object at the port and unit and the new object is created, and the new object is scheduled for probing. A link is embodied in the data structure of FIG. 4A, and an object is embodied in the data structure of FIG. 4B, described below.

FIG. 3B shows an example of how a portion of the FIG. 1 configuration graph is constructed using this method. Assume that the object for node 0 is now being probed, which means that the units on its ports are examined for connections to other devices. The five nested loops are executed to reach these units. The probing at some point finds con 1 (which is of device type Controller (CON)) in port 0, unit 1 of the PCI interface, as shown in the left column of FIG. 3B. In accordance with the method, an object is created for con 1 and a link is created between the con 1 object and node 0 object. The con 1 object is then scheduled for probing, and at some later time is probed. The probing finds interconnect 0 at port 0, unit 0 of the Fibre Channel (FC) interface, as shown in the middle column of the figure. Interconnect 0 is a device of device type Interconnect (INTRCN) that may be found on the FC interface. In accordance with the method, an object is created for interconnect 0 and a link is created between the interconnect 0 object and the con 1 object. The interconnect 0 object is then scheduled for probing, and at some later time is probed. The probing finds disk 3 at port 0, unit 3 of the Fibre Channel P interface, as shown in the right column of the figure. Disk 3 is a device of device type disk (DISK) that may be found on the Fibre Channel P (FCP) interface. In accordance with the method, an object is created for disk 3 and a link is created between the disk 3 object and the interconnect 0 object. Disk 3, however, is not scheduled for probing because it is evident when its object is created that it has no interfaces for connecting to other devices downstream.

When the above method is applied to all of system 10, the configuration graph of FIG. 1 is the result. Additional details about a particular embodiment of the method are described in U.S. patent application Ser. No. 09/307,128, which is hereby incorporated by reference.

Figure 4A:
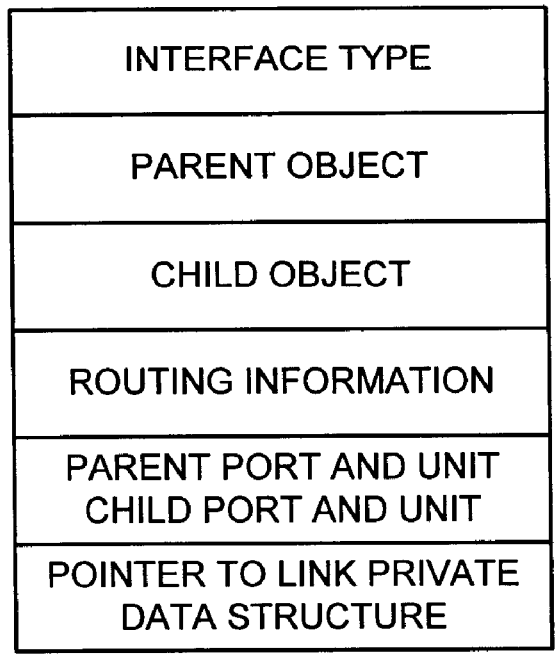
FIGS. 4A and B are block diagrams of exemplary data structures for links and objects represented by a configuration graph.
Figure 4B:
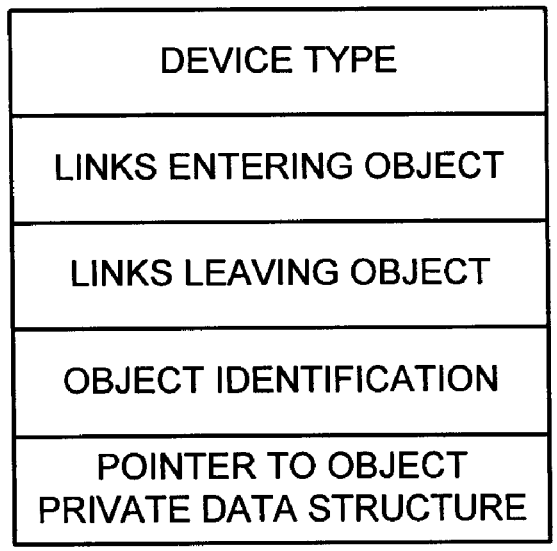

FIGS. 4A and B are block diagrams showing pertinent fields of exemplary data structures for the links and objects. It is the interconnection of these data structures that is represented by the configuration graph. FIG. 4A shows a link data structure which includes an interface type field that indicates the interface the link is made through, a parent object field that indicates where the link begins, a child object field that indicates where the link ends, and a field that indicates the parent object port and unit and child object port and unit for the link. The data structure also has a routing information field that, when filled, indicates which nodes can be directly reached through the link, i.e., without traversing system interconnect 20. The routing information is added to the field in the manner described below. The data structure further has a pointer to a link private data structure shown in FIG. 5, also to be described. FIG. 4B shows an object data structure which includes a device type field, a field indicating the incoming links entering the object, a field indicating the outgoing links leaving the object, and an object identification field. Similar to the link data structure, the object data structure also has a pointer to an object private data structure shown in FIG. 5.

Propagating Node Designations as Routing Information

At system initialization, the designations for the node (node numbers in the illustrative embodiment) are propagated down from the nodes through the configuration graph using well-known graph traversal techniques. The node numbers are routing information that indicates which nodes can be directly reached from an I/O subsystem device via the link. A node number is propagated through the graph by determining which links are along a direct path to a node and then storing the node number into the routing information field of each of these link data structures. A node number is propagated from each node, so that multiple node numbers may end up being stored in a link that can directly reach multiple nodes.

The routing information is shown in FIG. 1 as the node numbers in parentheses adjacent to the various links. Starting at node 0, for example, an examination of the parent object field of all the link data structures reveals that node 0 is the parent object of the links to the Ethnt, con 1, and con 2 child objects. Node number 0 is therefore stored in the routing information field for these link data structures. The link data structures are then examined for structures that have Ethnt, con 1, or con 2 as parent objects. This examination reveals two link data structures that have, respectively, con 1 and con 2 as parent objects and interconnect 0 as a child object. Node number 0 is therefore stored in the routing information field of these additional data structures. The process continues by examining the link data structures for structures that have interconnect 0 as a parent object. This examination reveals two link data structures that have disk 3 and con 5 as child objects. Node number 0 is therefore stored in the routing information field of these additional data structures. The process for propagating node number 0 ends when examination of the link data structures reveals that there are no link data structures that have disk 0–3 as parent objects.

The same process is followed for propagating the other node numbers. When a link data structure is encountered whose routing information field already contains a node number, the additional node number is added to the field. This indicates that the link leads directly to multiple nodes. An example of such as link data structure is the one for the link between interconnect 3 and disk 0, where the routing information field contains node numbers 0, 1, and 2.

Examining the link data structures to propagate the node numbers may be done in any of a number of ways, such as breadth-first (across the nodes) or depth-first (each node down through the graph). For on-line insertion or on-line removal of a system element such as a controller or interconnect, the method may be optimized if desired by starting from the point of the element's insertion or removal from the system.

Building Routing Tables

Figure 5:
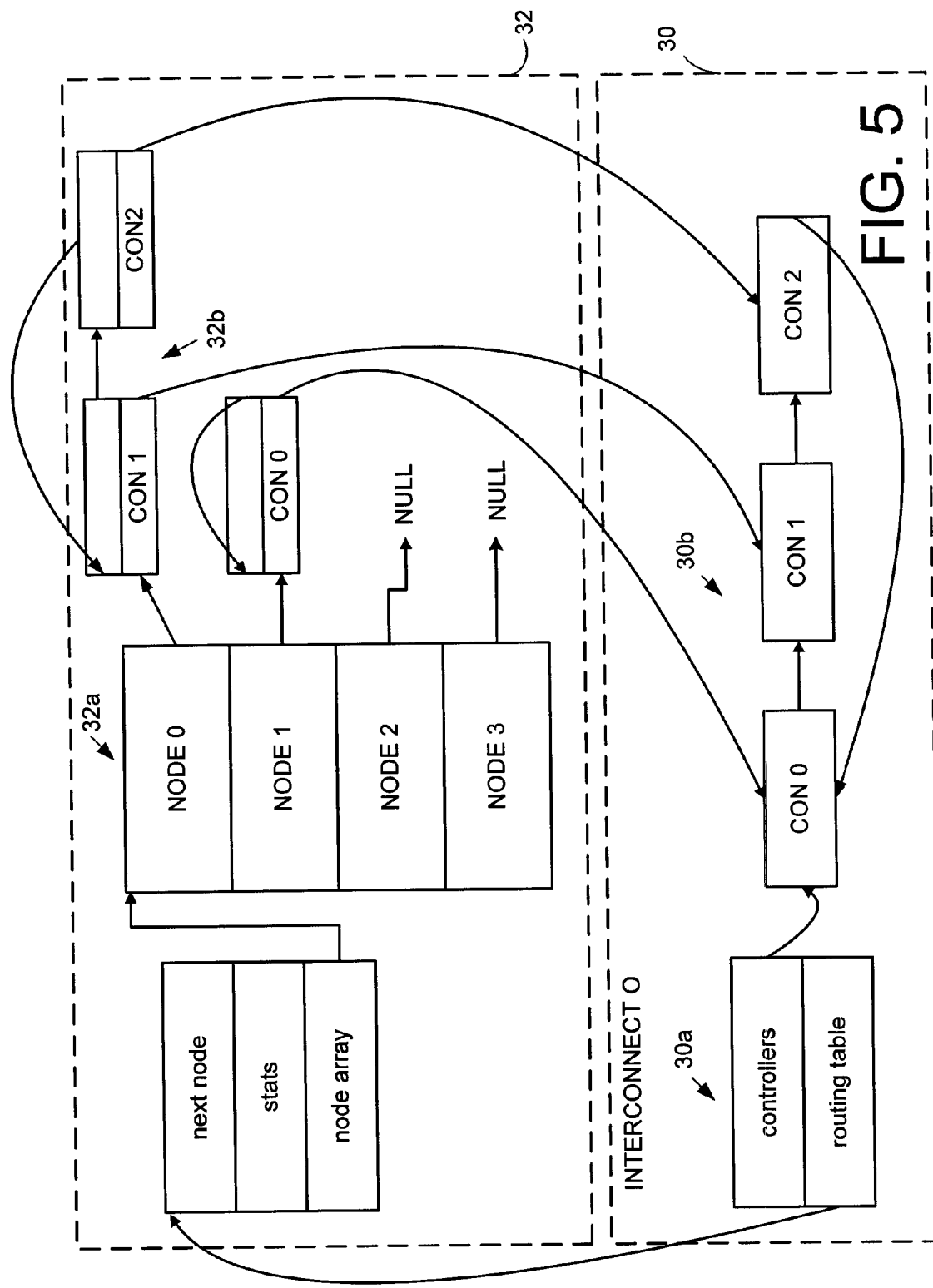
FIG. 5 is a block diagram of an exemplary driver data structure and routing table for determining an optimal I/O path through a multiprocessor system.

FIG. 5 shows two data structures 30 and 32 that are built for interconnect 0 as part of constructing the graph of FIG. 1. Data structures similar to these are created for each object that has multiple entering links. Data structure 30 contains an object private data structure 30*a* (see FIG. 4B) and linked list 30*b* of link private data structures (see FIG. 4A) for links entering the object. Structure 30*a* contains a pointer to linked list 30*b* and also a pointer to structure 32, which is a routing table that contains routing information for the object associated with these data structures.

Routing table 32 includes a next node field and a node array field (shown expanded as structure 32*a*). Each element of the node array points to a linked list 32*b* of elements representing objects that are on a direct path between the present object and a node, based on the routing information in the link data structures. From the viewpoint of interconnect 0, controllers 1 and 2 are objects that allow the interconnect to directly reach node 0 and are thus in the linked list pointed to by the node 0 array element. Similarly, controller 0 is in the linked list pointed to by the node 1 array element. No linked lists of objects are pointed to by the node 2 and 3 array elements because no objects connect these nodes to interconnect 0. The elements of these linked lists each include a pointer to the related element of linked list 30*b* for access to information therein about the represented object.

The routing table 32 is constructed to provide an efficient way of selecting a link for an I/O path where there is no single optimal link entering an object. It does this using two round-robin selections. One selection is among nodes when the routing information indicates that an intended node cannot be reached directly by one of the links. The other selection is among multiple links that directly connect the object to the intended node, represented by a linked list 32b that has more than one element. In FIG. 5, for example, assume an I/O path is to be established from disk 3 to node 3. There is, however, no direct path to node 3. An indirect path must be established through another node. That node is chosen, with a final connection between that node and node 3 across the system interconnect 20. This failure is noted at the point the path is being established through interconnect 0. The next node pointer of table 32 is then read, and it points to one of the elements in array 32*a*. If it is presently pointing to an array element that has no linked list, then the pointer is advanced in a round robin manner to the next element that has a linked list. This node becomes the node through which the path to node 3 is established. If the linked list pointed to by the selected array element has multiple elements, then a second round robin selection is made by choosing the head element of the list. The head is then moved to the next element in line. In this way, selections alternate among the elements of the list. In FIG. 5, for example, if node 0 is chosen in the first round robin selection, then controller 1 might be selected in the second round robin selection. Controller 2 would be selected the next time node 0 is the destination for the I/O path.

The two round robin selections are not always used together, of course. If there is a direct path through a link from the object to the intended node, then reference is made to that node's array element directly without the round robin choice of nodes. Only the second round robin selection is then employed. If the linked list has only one element, the pointer is simply moved back to the same element each time.

The routing table 32 for an object is rebuilt when a change in the configuration of multiprocessor system 10 affects the object. If a routing table is in use during a system change, a new table is built concurrently. The pointer from data structure 30 to table 32 is then switched from the old routing table to the new one once all prior I/O requests have been resolved.

Examining the Routing Information

An optimal path is established in response to each I/O request (at run time), through an examination of the routing information. An I/O request is typically initiated by an operating system call to an I/O routine. The system call may include information such as amount of data involved (for a read or write), the I/O device, and the memory location of the buffer for sending or receiving the data. With this information a process on one processor node can request that information be communicated between an I/O device and memory located on another processor node.

Figure 6:
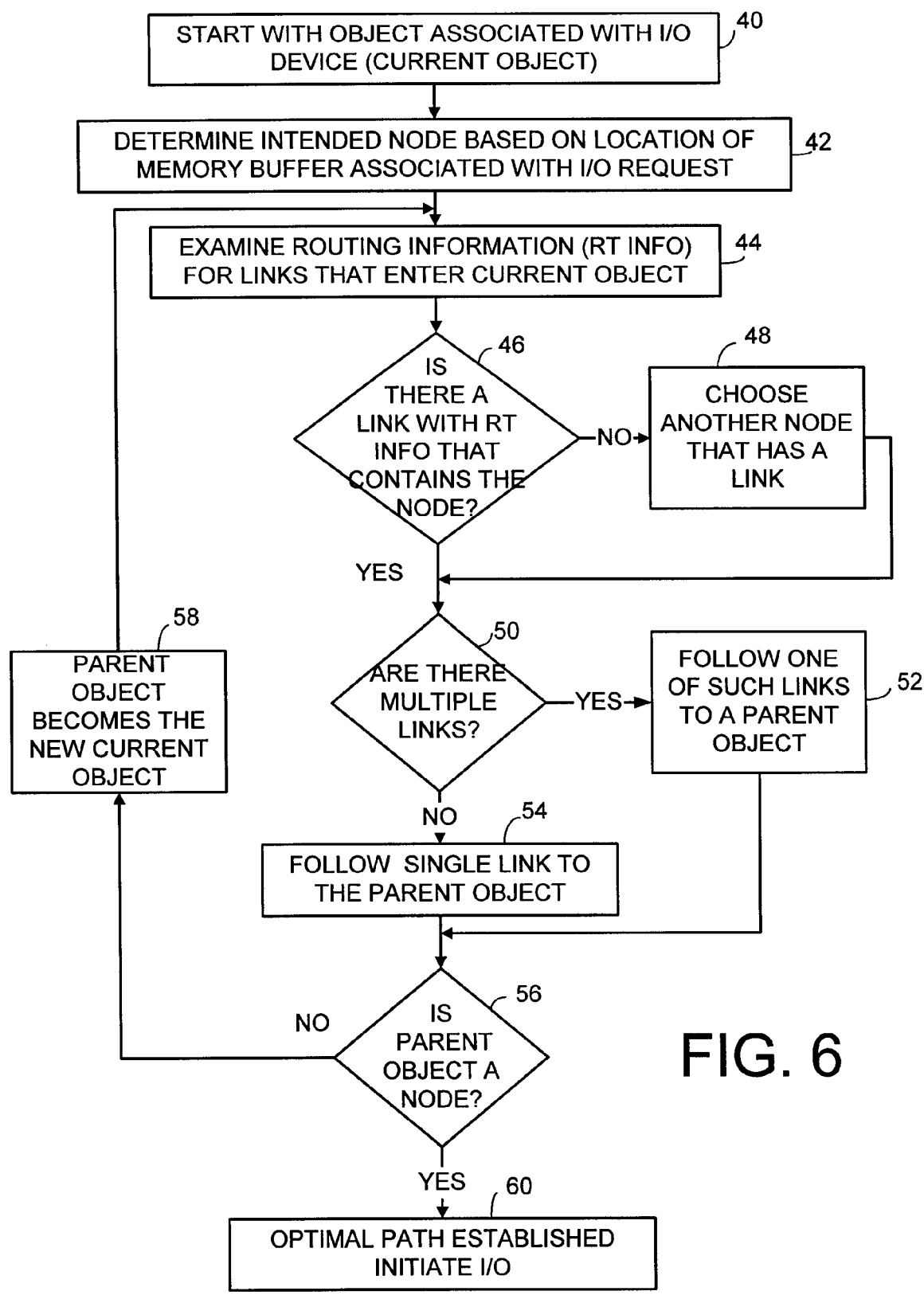
FIG. 6 is a flowchart of a method for establishing an optimal path through a multiprocessor system.

FIG. 6 is a flowchart that generally describes a method for establishing an optimal path in response to an I/O request, one that is, if possible, a direct path between the I/O device and the intended node. The method starts with the object associated with the designated I/O device (which is typically an I/O device but may be a subsystem device) (40). This object is referred to as the current object, since it is the first object encountered in establishing the I/O path. A determination is made of the intended node for communication, based on the location of the memory buffer associated with the I/O request (42). The routing information of the links entering the current object is then examined (44). The links are first checked to determine if any has routing information that contains the intended node (46). If not, then no direct path to the node exists, and another node is chosen to which a link directly connects (48). This other node is selected, such as in the round-robin manner described with respect to the array 32a in FIG. 5. A determination is then made whether there are multiple links from the current object to the selected node (50). If there are, one is selected and followed (52), such as in the round robin manner described with respect to the linked lists 32b in FIG. 5. If there is only a single link, then that link is followed to the parent object (54).

The actions 44–54, of course, can be implemented in any number of ways. For example, in the embodiment of FIG. 5 there is no actual check on whether there a multiple links. The element at the head of the linked list 32b is simply selected and the pointer is then changed to point to the following element of the list. If there is only one element in the list, the pointer will end up pointing to the same element. If there are multiple elements in the list, the pointer is then changed to point to the following element.

The parent object reached from the selected link is then examined to see if it is a node (56). If not, the parent object becomes the next current object (58) and the actions 44–58 are repeated until the parent object is a node. In repeating action 46, a node previously chosen per action 48 may now be considered the intended node. Alternatively, another node may be chosen.

At action 56, the optimal path is established if the parent object is a node (60). If the parent object represents the intended node, then a direct path has been established from the I/O device to the node. If the parent object represents another node, then an additional connection is made from the other node to the intended node across the system interconnect 20. In either case, transfer of data can be initiated once the path is established.

Figure 7:
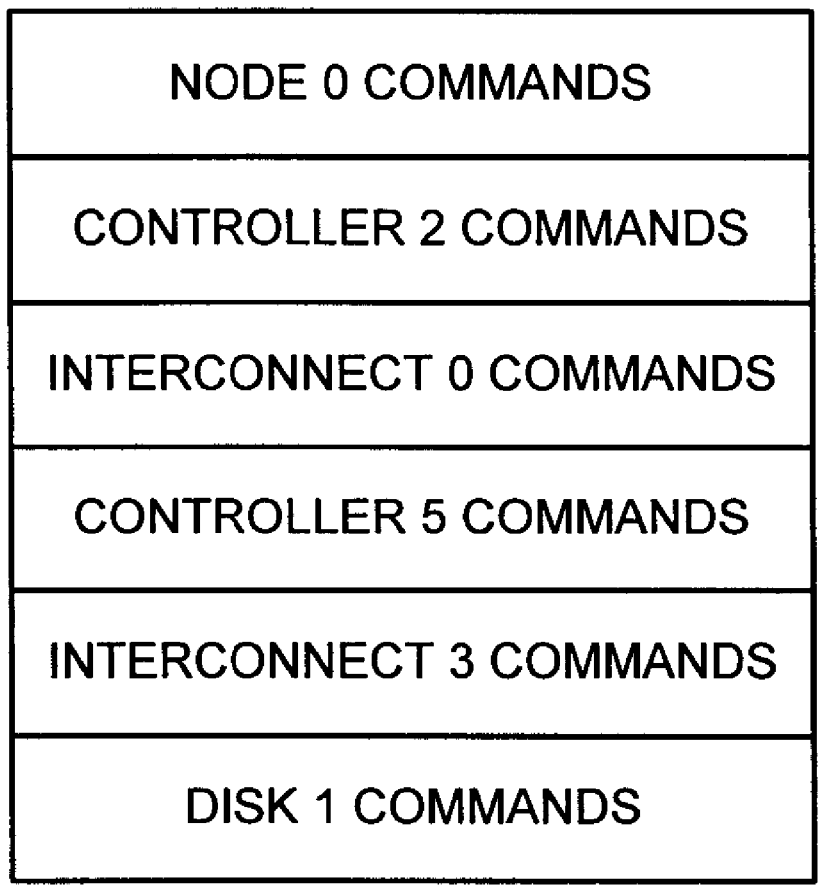
FIG. 7 is a block diagram of a command block that is constructed as part of establishing an optimal path.

The I/O path is stored in a command block that controls the multiprocessor system elements to direct the data along the path. FIG. 7 is a representation of the command block. These commands may be stored in one location as a single block or distributed throughout the system elements.

If choosing an optimal path among multiple I/O paths is not of concern, then an I/O path may be established between an intended node and an I/O device without use of the routing information. A method for establishing such an I/O path includes providing a configuration graph of the computer system and simply following links in the graph from an object associated with the I/O device to an object associated with a node. If the computer system is a multiprocessor system having a number of interconnected nodes and the object associated with the node is not associated with the intended node, then a final link across the system interconnect 20 is required to complete the path. Where multiple links connecting an object to other objects are encountered, one of the links can be selected according to an order such as in a round robin manner.

The method may also be used as part of the fault tolerance of a computer system by providing an alternative path if the original path chosen is blocked. If, once the system devices attempt to communicate across the original path, it is discovered that a device along the path is disabled, this information is stored in the appropriate link private data structures that appear in linked list 30b of FIG. 5. The method is then again invoked to find an optimal path. This time, however, a device whose associated link private data structure is marked disabled is not considered in establishing the path. Instead, an alternative path is established that avoids the disabled device.

Having illustrated and described the principles of the invention in an exemplary embodiment, it should be apparent to those skilled in the art that the illustrative embodiment can be modified in arrangement and detail without departing from such principles. For example, certain aspects of the invention may be used in uniprocessor systems. Software aspects of the embodiment may be implemented in hardware and hardware aspects may be implemented in software. Data structures may be combined or partitioned or others of various types may be substituted for those shown in the embodiment. The actions illustrated in the flowcharts may be taken in other orders. Selection techniques other than round robin may be used. In view of the many possible embodiments to which the principles of the invention may be applied, it should be understood that the illustrative embodiment is intended only to teach these principles and is not intended to limit the scope of the invention. Rather, the invention is defined in the following claims. We therefore claim as our invention all that comes within the scope and spirit of these claims and their equivalents.

We claim:

1. In a multiprocessor system having a number of interconnected processor nodes, an I/O device, and multiple I/O paths from the I/O device to the nodes, a method for establishing an optimal path between a node and the I/O device comprising:

providing a configuration graph of the multiprocessor system, the graph having objects associated with the I/O device and the nodes of the multiprocessor system and links connecting the objects, the links having routing information containing nodes that can be directly reached via the link;

identifying the node; and following, if possible, links in the graph whose routing information contains the identified node from an object associated with the I/O device to an object associated with the identified node.

2. The method of claim 1 wherein following links in the graph includes:

identifying an object associated with the I/O device;

examining routing information of links entering the object;

from the object, following a link whose routing information contains the identified node to another object;

identifying the other object as part of the optimal path; and repeating the actions of examining, following, and identifying until an object reached by a followed link is a node.

3. The method of claim 2 wherein following links in the graph further includes following a link whose routing information does not contain the identified node if there is no link whose routing information contains the identified node.

4. The method of claim 3 wherein following links in the graph includes, where there are multiple links whose routing information does not contain the identified node, selecting one of the links in a round robin manner.

5. The method of claim 1 wherein following links in the graph includes, where multiple links have routing information that contains the identified node, selecting one of the links in a round robin manner.

6. The method of claim 1 wherein identifying the node comprises determining an intended node base don the location of a memory buffer associated with an I/O request.

7. The method of claim 1 wherein the routing information is contained within a routing table.

8. The method of claim 1 wherein, if the established path is blocked, removing the associated object from path consideration and repeating the method to establish a new path.

9. A computer-readable medium on which is stored a set of instructions for executing the method of claim 1.

10. In a multiprocessor system having a number of interconnected processor nodes, an I/O device, and multiple I/O paths from the I/O device to the nodes a method for providing routing information for establishing paths between a node and the I/O device comprising:

constructing a configuration graph of the multiprocessor system, the graph having objects associated with the I/O device and the node of the multiprocessor system and links connecting the objects; and propagating node designations as routing information from objects associated with the node through the links of the graph to an object associated with the I/O device.

11. The method of claim 10 wherein constructing a configuration graph includes:

creating an object for each processor node;

probing each node object for devices attached thereto;

creating an object for each attached device and a link thereto;

probing each device object for other devices attached thereto; and repeating the creating of device objects and links thereto and the probing of device objects until no more attached devices are found.

12. The method of claim 10 wherein propagating node designations includes inserting node designations into data structures representing the links of the configuration graph.

13. The method of claim 10 including, in response to an I/O request, identifying a node and examining the routing information to establish an optimal path between the identified node and the I/O device.

14. The method of claim 13 wherein examining the routing information includes following, if possible, links in the graph whose routing information contains the identified node from an object associated with the I/O device to an object associated with the identified node.

15. A computer-readable medium on which is stored a set of instructions for executing the method of claim 10.

16. A computer-readable medium on which is stored a configuration graph for a computer system having at least one node and an I/O device, the graph comprising:

objects associated with the node and the I/O device of the computer system; and links connecting the objects, the links having routing information containing nodes that can be directly reached via the link.

17. In a computer system having at least one node, an I/O device, and multiple I/O paths from the I/O device to a node, a method for establishing a path between the node and the I/O device comprising:

providing a configuration graph of the computer system, the graph having objects associated with the node. the I/O device, and other devices of the system and, for at least one child object, multiple incoming links connecting a child object to multiple parent objects; and following links in the graph from an object associated with the I/O device to an object associated with the node.

18. The method of claim 17 wherein following links in the graph includes, at a child object having multiple links to multiple parent objects, selecting one of the links in a round robin manner.

19. A computer readable medium on which is stored a set of instructions for executing the method of claim 17.

20. The method of claim 17 wherein the computer system is a multiprocessor system having a non-uniform memory access architecture.

* * * * *